United States Patent
Li et al.

(10) Patent No.: US 6,350,404 B1
(45) Date of Patent: Feb. 26, 2002

(54) METHOD FOR PRODUCING A CERAMIC PART WITH AN INTERNAL STRUCTURE

(75) Inventors: Chien-Wei Li, Livingston; Maria Melanie Matic, South Orange, both of NJ (US)

(73) Assignee: Honeywell International, Inc., Morris Township, NJ (US)

(*) Notice: Subject to any disclaimer, the term of this patent is extended or adjusted under 35 U.S.C. 154(b) by 0 days.

(21) Appl. No.: 09/592,320

(22) Filed: Jun. 13, 2000

(51) Int. Cl.⁷ .................................................. B28B 1/26
(52) U.S. Cl. ....................................... 264/635; 264/651
(58) Field of Search .................................. 264/635, 651

(56) References Cited

U.S. PATENT DOCUMENTS

| | | |
|---|---|---|
| 4,067,662 A | 1/1978 | Rossmann |
| 4,376,004 A | 3/1983 | Bratton et al. |
| 4,384,607 A | 5/1983 | Wood et al. |
| 4,579,705 A | 4/1986 | Matsuoka et al. |
| 4,783,297 A | 11/1988 | Ito et al. |
| 4,820,128 A | 4/1989 | Ito |
| 4,975,225 A * | 12/1990 | Vivaldi et al. ............ 264/28 |
| 5,178,519 A | 1/1993 | Kawasaki et al. |
| 5,536,145 A | 7/1996 | Vandendriessche |
| 5,679,270 A | 10/1997 | Thornton et al. |
| 5,820,774 A | 10/1998 | Dietrich |
| 6,120,713 A * | 9/2000 | Cuisin et al. ............ 264/43 |
| H48 H * | 4/1986 | Heichel .................... 264/44 |

* cited by examiner

Primary Examiner—Christopher A. Fiorilla
(74) Attorney, Agent, or Firm—Robert Desmond, Esq.

(57) ABSTRACT

A method for forming a ceramic part with an internal structure includes aqueous slip-casting and a polystyrene foam insert. An aqueous slurry is poured over the insert to form a green body. The insert is shaped to produce the desired internal structure upon being encased by the slurry. The insert is then removed from the green body by dissolving it in trichloroethylene. Because the polystyrene foam does not expand when exposed to trichloroethylene and rapidly dissolves, build up of shrinkage stress in the green body is avoided. The green body is then sintered to produce the ceramic part with an internal structure.

7 Claims, 1 Drawing Sheet

METHOD FOR PRODUCING A CERAMIC PART WITH AN INTERNAL STRUCTURE

TECHNICAL FIELD

This invention relates to a method of forming ceramic parts having internal structure such as ceramic gas turbine blades and nozzles with internal cooling air passages.

BACKGROUND OF THE INVENTION

To withstand the high gas temperatures generated in the combustor of gas turbine propulsion engines, single crystal, super-alloy turbine blades and nozzles, just downstream of the combustor, employ internal cooling channels and/or thermal barrier coatings. At such high operating temperature, turbine engines can generate high thrust with low fuel consumption and pollutant levels. Over the last two decades, is significant efforts have been devoted to the improvement of high temperature properties of single crystal super-alloys and their casting technology to satisfy the increasing demand for high performance turbine engines. Although the technology of manufacturing turbine engine components with cooling channels is well established, the cost associated with these types of parts is very high because of the low yield and the need of a thermal barrier coating. Normally, the part is fabricated from a lost wax process. In that process, a wax pattern having the shape of the final part and a ceramic core of the cooling channel structure is manufactured, and the casting mold is fabricated from repeatedly dipping the wax pattern into ceramic slurries. During the removal of wax pattern through melting, very often the mold cracks because of the expansion of the wax, reducing the yield of the process.

Silicon nitride ceramics are known for their excellent strength, toughness, creep rupture resistance and the overall capability to withstand high temperatures. Using a standard processing method like slip-casting, bisque machining, injection molding, iso-pressing, or gel-casting, they can be manufactured into complex shapes. Indeed, silicon nitride ceramics have been manufactured into uncooled turbine blades and nozzles that match or exceed the performance of those made from single crystal super-alloys with thermal barrier coating and cooling channels. Because cooling from the engine is not needed to cool the blades, the engine operates with much higher efficiency.

Without the cooling and thermal barrier coatings, advanced silicon nitride parts can operate in gas temperatures up to 1400° C. However, there is a strong desire among the engine manufacturers to further increase the turbine engine gas temperature to 1500–1600° C. for high efficiency where even the best silicon nitride would have difficulty meeting the mechanical property requirements. At such gas temperatures, either cooled metallic components or uncooled silicon nitride components cannot survive the environment.

Accordingly, there is a need for a method for forming ceramic parts with internal cooling air structures.

SUMMARY OF THE INVENTION

An object of the present invention is to provide a method for forming a ceramic part with an internal structure.

Another object is to provide a ceramic article having an internal structure.

The present invention achieves these objectives by providing a method for forming a ceramic part with an internal structure that includes aqueous slip-casting and a polystyrene foam insert. An aqueous slurry is poured over the insert which is shaped to produce the desired internal structure upon being encased by the slurry to form a green body. The insert is then removed by dissolving it in trichloroethylene. Because the polystyrene foam does not expand when exposed to trichloroethylene and rapidly dissolves, build up of shrinkage stress in the green body is avoided. The green body is then sintered to produce the ceramic part with an internal structure.

These and other objects, features and advantages of the present invention, are specifically set forth in, or will become apparent from, the following detailed description of a preferred embodiment of the invention when read in conjunction with the accompanying drawing.

BRIEF DESCRIPTION OF THE DRAWING

The sole FIGURE is a flow chart of the method contemplated by the present invention.

DESCRIPTION OF THE PREFERRED EMBODIMENT

Figure 1:
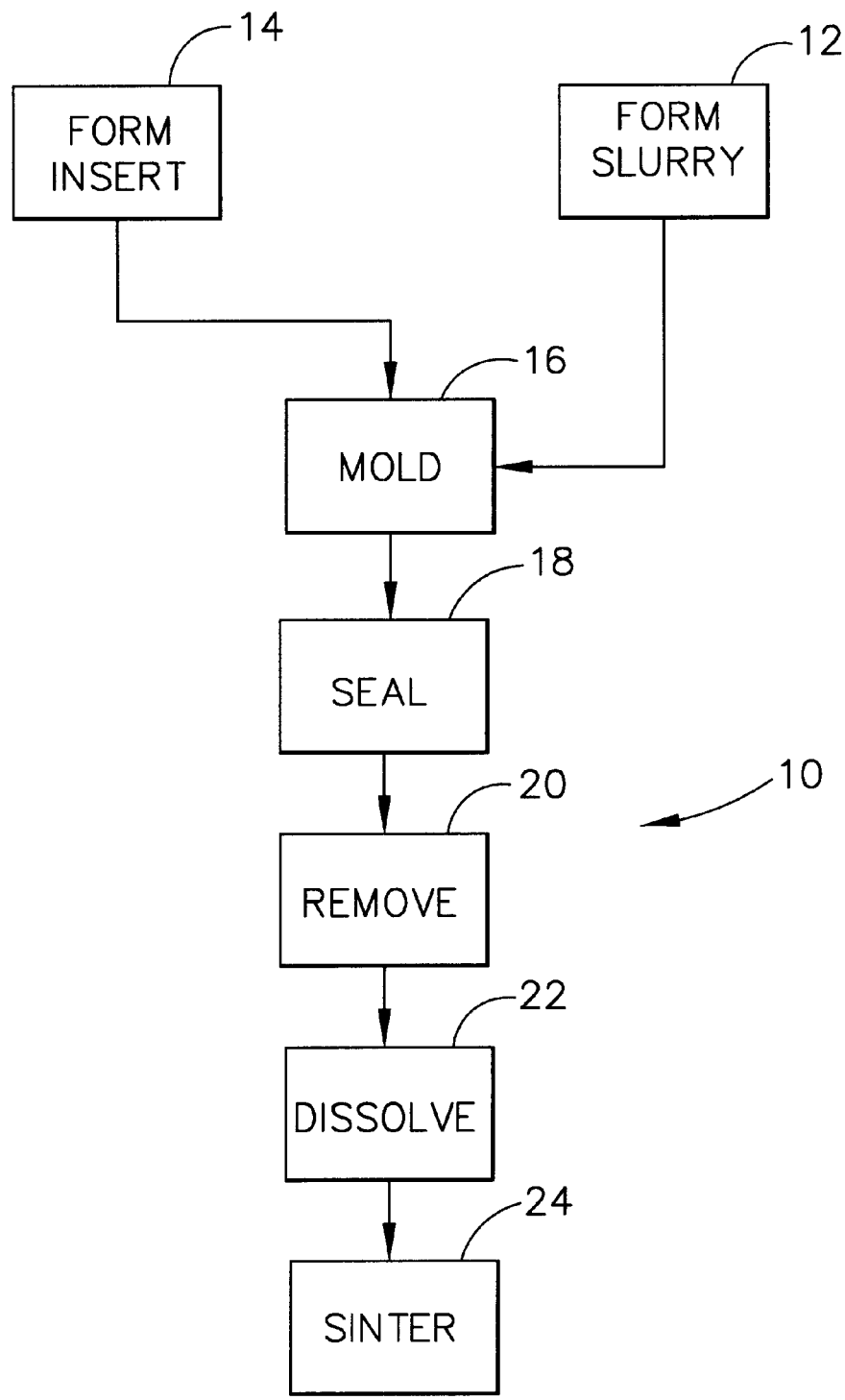

Referring to the sole FIGURE, a silicon nitride part with internal structure is manufactured using a method generally denoted by reference numeral 10 that includes aqueous slip-casting and a polystyrene foam insert. In one example of the present invention, the aqueous slurry is formed, box 12, by ball milling a powder containing about 81.8 weight % silicon nitride, 10 weight % silicon carbide, 5 weight % $Y_2O_3$, 2 weight % $La_2O_3$, and 1.2 weight % $SrCO_3$ in water for 22 hours. For improving powder dispersion, the pH of the slip is kept above 9 and a dispersant such as Darvan C can be used. The ratio of the weight of powder to the weight of water is 70/30. The insert is formed, box 14, from a polystyrene foam to have a pattern that when encased by the slurry will result in the desired shape of the internal structure. The pattern can be fabricated by injection molding, machining, or other forming methods. In one example, the insert was formed into a rectangle 1" by ¾" by ⅛" with three rows of holes of 1/16" in diameter and ⅛" apart. Teflon mold with an opening of 2.6" by 2.6" by 2" is used as the slip-casting mold. Referring to box 16, the insert is placed edge-on in the middle of the Teflon mold that sits on top of a plaster block. The aqueous slurry weighing 250 g is poured into the mold and totally encloses the insert. After pouring the slip, the mold is sealed and a gas pressure of 40 psi is applied to the top of the slip to accelerate the removal of water, box 18.

As soon as the water disappears from the top of the slip-cast block, the green body, silicon nitride block is removed from the mold, box 20, and then immersed in a solvent for dissolving the insert, box 22. The solvent used in this example is trichloroethylene (TCE), which dissolves the polystyrene foam insert in less than 10 seconds. Other solvents, such as toluene and acetone can also be used. Because of the fast dissolution rate of polystyrene foam in TCE, the insert is removed from the green ceramic almost instantaneously without building up the stress in the green body generated from the drying shrinkage. As a result, a green ceramic body with an internal structures is manufactured without any cracking. The part manufactured is then gas-pressure-sintered, box 24, to 99.6% of the theoretical density using a final sintering temperature of 2025° C., without any cracking after sintering.

In contrast to the present invention, inserts made out of standard s investment casting wax with dimensions similar to the polystyrene foam mentioned above were formed.

Using the same slip-casting process as previously described and dissolving the wax in TCE, cracks in the green bodies were observed. It is believed that the cracking results from the shrinkage of the green body, with a wax insert inside, as the water diffuses out of the body. Alternatively, the wax insert can be removed from the green body through melting the wax in higher temperature. The expansion of the wax at high temperature, however, also produces cracks.

Thus, ceramic part with internal structure such as turbine blades with internal cooling passages can be manufactured using fugitive inserts that can be removed without cracking the ceramic body. The insert can have a complex shape fabricated by injection molding, machining, or other forming methods. The ceramic body can have the shape of a final component if a net-shape forming process, e.g., slip-casting, gel-casting, or injection molding, is used. Alternatively, the ceramic body can have a simple shape during the green forming process with insert, and later machined into the final shape. The green ceramic body with internal structures can then be sintered to full density, using a standard firing process like pressureless sintering, gas pressure sintering or hot isostatic pressing. Advantageously, the internal structure is easily built into the ceramic body during the green processing without the need of expensive machining. Furthermore, complex internal structure can be difficult, or impossible, to be machined into products like turbine blades and nozzles.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A method of forming a ceramic part with an internal structure comprising the steps of:
   a) providing a slurry containing a ceramic;
   b) providing a dissolvable, polystyrene foam insert having a pattern;
   c) pouring the slurry around the insert to form a green body;
   d) dissolving the insert to form the internal structure, said dissolving using trichloroethylene as a solvent so as to dissolve the insert without substantially building up stress in the green body; and
   e) drying and sintering the green body to form the ceramic.

2. The method of claim 1 wherein step (d) comprises dissolving the insert with trichloroethylene solvent in less than 10 seconds.

3. The method of claim 1 wherein the solvent is toluene.

4. The method of claim 1 wherein the solvent is acetone.

5. The method of claim 1 wherein said insert is formed of a material that will dissolve without expanding.

6. The method of claim 1 wherein the ceramic is silicon nitride.

7. The method of claim 1 wherein the slurry is formed by ball milling a powder containing about 81.8 weight % silicon nitride, 10 weight % silicon carbide, 5 weight % $Y_2O_3$, 2 weight % $La_2O_3$, and 1.2 weight % $SrCO_3$ in water.

* * * * *